United States Patent
Taylor

[15] 3,665,476
[45] May 23, 1972

[54] ANTENNA
[72] Inventor: Allen R. Taylor, Nutley, N.J.
[73] Assignee: The Singer Co., New York, New York
[22] Filed: Dec. 1, 1965
[21] Appl. No.: 510,808

[52] U.S. Cl. ..............................343/701, 343/788, 343/709
[51] Int. Cl. .........................................................H01q 1/26
[58] Field of Search...............343/701, 788, 792.5, 895, 709, 343/719

[56] References Cited

UNITED STATES PATENTS

| | | | |
|---|---|---|---|
| 2,757,287 | 7/1956 | Stanley | 343/788 X |
| 3,051,903 | 8/1962 | Marrow | 343/701 X |
| 3,098,973 | 7/1963 | Wickersham, Jr. et al. | 343/701 |
| 3,162,855 | 12/1964 | Copeland et al. | 343/792.5 X |

OTHER PUBLICATIONS

Electronics, Oct. 6, 1961, pp. 68–71.

Primary Examiner—Samuel Feinberg
Assistant Examiner—Richard E. Berger
Attorney—S. A. Giarratana and T. W. Kennedy

[57] ABSTRACT

A receiving antenna for submarines wherein tunnel diodes are inductively coupled to a plurality of ferrite rod by a coupling link. The tunnel diodes are back-biased by a biasing circuit to establish operation in the negative resistance region. Bias current and coupling are adjusted to provide cancellation of the major portion of the ferrite core losses and copper losses of the main turning winding.

1 Claim, 12 Drawing Figures

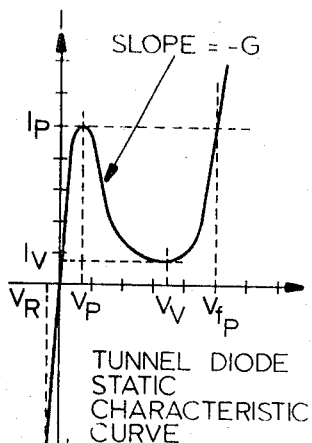
FIG. 1 TUNNEL DIODE STATIC CHARACTERISTIC CURVE
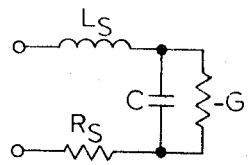
FIG. 2 TUNNEL DIODE EQUIVALENT CIRCUIT (BIASED IN NEGATIVE CONDUCTANCE REGION)
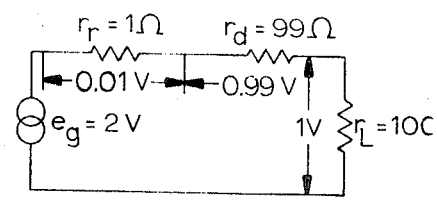
FIG. 3
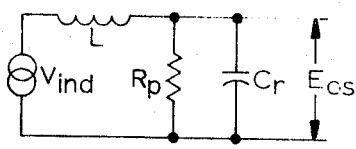
FIG. 4
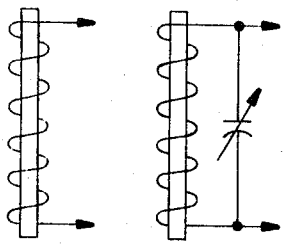
FIG. 5   FIG. 6
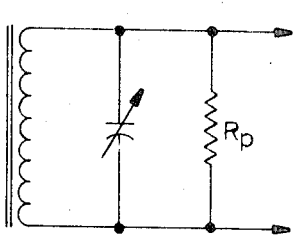
FIG. 7
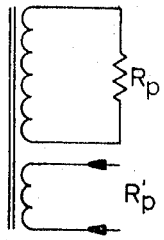
FIG. 8
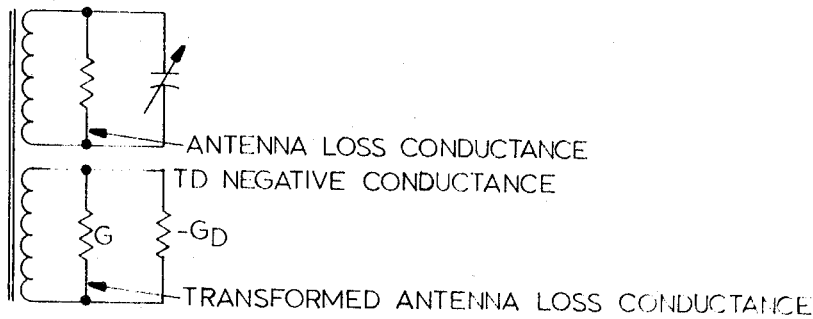
FIG. 9
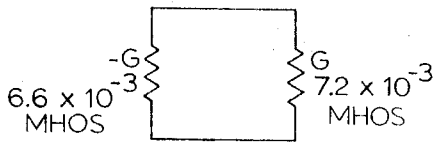
FIG. 10
ALLEN R. TAYLOR
INVENTOR.
BY
ATTORNEY 3,665,476

ALLEN R. TAYLOR
INVENTOR.

ATTORNEY

ANTENNA

The present invention relates to underwater communications and more particularly to an antenna arrangement used in such a communication system.

As has been pointed out by C. A. Martin et al. in Chapter 19, Low Frequency Antennas of "Antenna Engineering Handbook" edited by Henry Jasik, McGraw-Hill Book Co., 1961, very low frequencies (VLF) penetrate into salt water, making communications with submerged submarines possible. The authors of this chapter also point out the numerous difficulties of mechanical construction having to do with regular (above water) use of VLF antennas and, although several types of very useful antenna systems are described such as towers, umbrellas, multiple tuned antennas, etc., it is at once apparent that the antennas described cannot be readily mounted on a submarine.

The size of the antenna is related to the length of the transmitted wave; for a very long wave, a very long antenna is required which, by its very nature, will not fit on a submarine. Although attempts may have been made to provide small and efficient VLF antennas for submarines, none of the present antennas can operate at great depth.

The invention, as well as the objects and advantages thereof, will be better understood from the following detailed description taken in connection with the accompanying drawing, in which:

FIG. 1 presents graphically the characteristic curve of a tunnel diode;

FIG. 2 corresponds to a tunnel diode equivalent schematic circuit;

FIG. 3 schematically depicts an antenna equivalent circuit;

FIG. 4 again depicts schematically another antenna equivalent circuit;

FIGS. 5–10 show in schematic form the action theoretically described in the specification;

Figure 11:
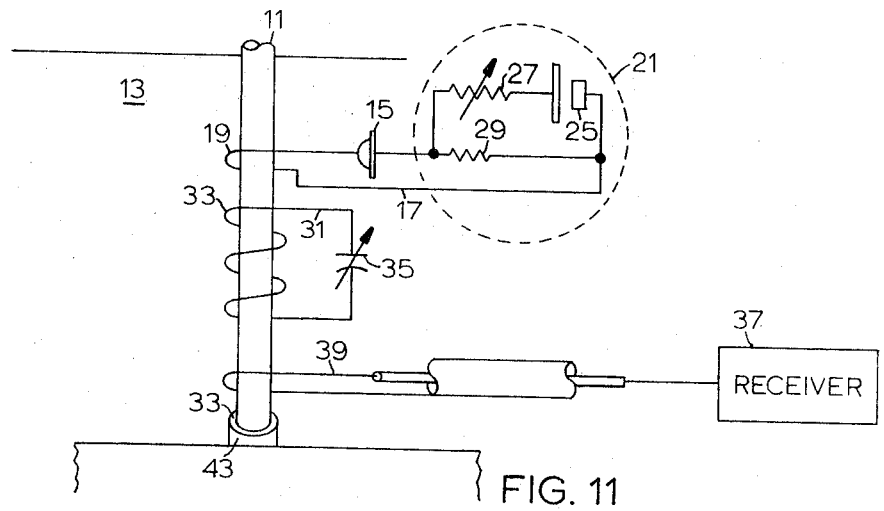
FIG. 11 illustrates schematically the present inventive concept.

Generally speaking, the present invention contemplates increasing the efficiency of a ferrite receiving antenna and consequently reduces the required size for a given sensitivity. This is achieved by having a tunnel diode inductively coupled to a ferrite antenna by a coupling link consisting of one or more turns of wire wound about the ferrite antenna. The tunnel diode is back-biased by means of biasing circuit to establish operation in the negative resistance region of its operating characteristic curve. Bias current and coupling are adjusted to provide cancellation of the major portion of the ferrite core losses and the copper losses of the main tuning winding.

Other negative resistance devices can be substituted for the tunnel diode and other methods of coupling this negative resistance into the ferrite antenna may be used. The tunnel diode circuit can also be used to cancel the loss resistance of other types of antennas. In order for those skilled in the art to better appreciate the inventive concept, the theoretical principles must first be considered.

When a ferrite rod is placed in a uniform field of B gauss, the field in the vicinity of the rod is perturbed in such a way as to produce a maximum flux density, $B_{max}$, at the center of the rod.

The rod permeability, $\mu_r$, is defined as the ratio of maximum flux density in the rod to the uniform field density outside the rod. That is $$\mu_r = B_{max}/B$$

The emf, $e$, induced in an air core inductance having N turns and an area A cm² perpendicular to a magnetic field whose flux density is B gauss is $$e = 2\pi f N A B \times 10^{-8} \text{ volts}$$

If a ferrite rod is inserted within this inductance, and the inductance is tuned to provide a resonant antenna, the induced emf, $e_r$, available at the receiver terminals becomes:

$$e_r = 2\pi f N A B Q \mu_r \times 10^{-8} \text{ volts}$$

From this equation it is obvious that if Q and/or $\mu_r$ could be increased, the available signal at the receiver terminals would in turn be increased. However, as is well known to workers in the field, other factors must also be considered.

The two principal factors affecting the performance of electrically small antennas are antenna aperture and efficiency. Aperture relates to the total radiated power intercepted by the antenna for a given field strength and the efficiency determines how much of this power is usable and how much lost in heating.

In a general sense, the antenna should have as large an aperture as possible. However, in the case of receiving antennas, there is another factor which limits the effectiveness of aperture. The desired result in receiving antennas is high signal-to-noise ratio. Noise is primarily receiver front-end noise above theoretical, Johnson noise and external received noise signals. The receiver front-end noise reduction is a primary design parameter and would usually be only a few decibels above theoretical. The Johnson noise depends on input resistance, temperature, and system bandwidth and is determined by other system and operational requirements. External noise is the total produced by cosmic radiation, electrical storms, man-made sources and so forth, and is a function of location, time, season and antenna pattern. For a given receiving system with a given value of receiver input noise, increasing the antenna aperture increases the signal-to-noise ratio until the point is reached where the external noise is equal to the receiver noise. Since the amount of external noise received is also a function of antenna aperture, any increase in size beyond this point will increase signal strength and noise equally, giving no improvement in signal-to-noise ratio.

Antenna efficiency is the ratio of radiation resistance to the total of radiation and loss resistance. The radiation resistance decreases exponentially with decreasing antenna size. For example, a quarter-wave whip has a radiation resistance of 36 ohms, an antenna 1/10th that size has a radiation resistance of 0.36 ohms, and a 20th that size would have a radiation resistance of only 0.09 ohms. The effect of this rapidly decreasing value is evident in the efficiency equation; for small antennas, even low values of copper, ferrite, and other equivalent loss resistances considerably degrade the antenna efficiency.

The radiation resistance of a small loop is:

$$R_{rad} = 320\pi^4 (A^2)/(\lambda^4)$$

(Henry Jasik "Antenna Engineering Handbook," page 6–2, McGraw Hill, 1961)

For N turns, the radiation resistance becomes $N^2$ times the value for a single turn. The radiation resistance is increased by the ferrite core as follows:

Assuming a loop antenna with a diameter of ⅝ in. and 58 turns assume $\lambda$ at 20kc = 1,500 $m$ = 5.9 × 10⁵ in.

For 1 turn, $$R_1 = 320\pi^4 \frac{\frac{(\pi 0.625^2)^2}{4}}{(5.9 \times 10^5)^4} = \frac{31300 \times 0.09}{1210 \times 10^{20}} = 2.43 \times 10^{-20} \Omega$$

For 58 turns, $$R_r = 58^2 \times R_1 = 3360 \times 2.43 \times 10^{-20} = 8.1 \times 10^{-17} \Omega$$

$$K \equiv \frac{L_{\text{ferrite}}}{L_{\text{air}}} = \frac{570 \ \mu H}{16} \text{(measured)} = 35.6,$$

⟨where $L$ = Inductance⟩

$$R_r \text{ ferrite} = K^2 R_r = 1260 \times 8.1 \times 10^{-17} \Omega = 1.02 \times 10^{-13} \Omega$$

This extremely small radiation resistance indicates how profoundly the antenna efficiency would be affected by even small copper and core losses. Antenna efficiency is represented by the equation $\eta = (R_r)/(R_r + R_L)$ where $R_r$ is the radiation resistance and $R_L$ the loss in the antenna. From the foregoing equation it is evident that the antenna efficiency can be increased by increasing the radiation resistance. This can be done by increasing the loop diameter, increasing the number of turns, or increasing the Q of the core material. The loop diameter is frequently limited by mechanical and operational considerations. The number of turns is limited partly by minimum capacities and desired tuning range. The Q of the core material has been improved slowly through the period of years.

The other factor in the efficiency equation is loss resistance. This is equally difficult to improve: copper is copper.

The present invention contemplates increasing efficiency by using a tunnel diode. Typical tunnel diode characteristics and equivalent circuit are shown in FIGS. 1 and 2. When the tunnel diode is biased to the negative resistance portion of its characteristics (−G), for signals which do not extend beyond the extremes of this slope, it introduces into the circuit a negative resistance. In the equivalent circuit shown, the −G counteracts the $R_s$ series resistance, reducing the circuit resistance. In the case of the ferrite core loop antenna where the series resistance represents loss and reduced efficiency the properly introduced and biased tunnel diode reduces loss and increases antenna efficiency.

In an actual example, the tunnel diode selected had a negative conductance slope of $-6.6 \times 10^{-3}$ mhos, which is the equivalent of a negative resistance of 150 ohms. The actual negative resistance coupled to the loop circuit depends upon the relative number of turns of the loop and tunnel diode coupling coil, and the tightness of coupling. For stability, the bias voltage should not be shifted toward the top or bottom curves of the characteristic, but should remain fixed at the point of maximum negative slope. By proper coil design and coupling adjustment a selectable amount of negative resistance can be introduced into the coil circuit, canceling most of the circuit losses. Expressing this relationship in the same manner as the previous equation gives:

$$\eta = \frac{R_r}{R_r + R_L - R_{TD}}$$

This provides a considerable increase in antenna efficiency and an improved signal-to-noise ratio.

It is well known that a small antenna, free of dissipation, could take from a radio wave and deliver to a load resistor an amount of power independent of the size of the antenna.

This phenomenon is sometimes referred to as "superdirectivity." Antenna directivity is defined as the ratio of its maximum radiation intensity to its average radiation intensity. The directivity of an antenna is also related to its effective aperture. An increase in the antenna directivity results in a proportional increase in effective aperture. The effective aperture of an isotropic source is $0.079\lambda^2$ and the directivity of this source is 1.0. A short dipole antenna has an effective aperture of $0.119\lambda^2$ and a directivity of 1.5.

It is noted that this effective aperture of $0.119\lambda^2$ is independent of the smallness of the dipole as long as it is considerably less than $\lambda/2$ in all cases.

The effective aperture can be considered as the area of a window in space, given in terms of square wavelength, over which it extracts energy from a passing radio wave.

A "loss-free" antenna can extract and deliver to a load one-half of this energy, if the load resistance is equal to the antenna radiation resistance.

Although one-half of the received power is re-radiated, this condition provides maximum possible power delivered to the load from any antenna.

Thus the aperture independent of antenna size implies that a perfectly conducting antenna of infinitesimal dimensions is capable of intercepting from a plane wave the same amount of power (½ of the power incident on the effective aperture) as would be available from an antenna with physical dimensions many times this size. This does not seem to be in agreement with the usual concept of antenna aperture where one visualizes the absorption of power incident on a resistive sheet of the given area or power collected by a horn antenna being routed to a terminating resistor. These are antennas of a definite size collecting an amount of power that would impinge on an area of this size. How then can a perfectly conducting superdirective antenna collect power from an area much greater than its size? The answer is found in the combination of resonance and low radiation resistance. At resonance a small antenna with low radiation resistance (and no losses) has a strong reactive field extending to large distances from it. This antenna has the ability to extract energy from an area of the passing wave that is as large as this reactive field. The limited knowledge and use of this phenomenon is because this effect is obscured by the attendant loss resistance in the small antenna and loss resistance in the associated tuning circuit. This can be illustrated by the antennas equivalent circuit shown in FIG. 3, where $e_g$ = generator voltage
$r_r$ = radiation resistance
$r_d$ = loss resistance
$r_L$ = load resistance.

The values chosen are for purposes of illustration only, to show the effect of varying the circuit loss resistances when $d > d > r_r$. Here the power from the antenna delivered to a separate load, when the load resistance is adjusted for maximum power transfer, $r_L = 100$ ohms, is $e^2/r_L = 1/100$ watts. The total power extracted from the passing wave is twice this power and the power re-radiated is $(0.01)^2/1 = 0.0001$ watts. Now consider a reduction of the loss resistance to one-tenth of its original value, as shown. The proper choice of $r_L$ to provide maximum power in the load is 10.9 ohms, providing a power delivered to the load of $e^2/r_r = 1/10.9$ or 0.092 watts. The total power extracted from the passing wave in this case has increased to 0.184 watts, and the power re-radiated increased to $(0.092)^2/1 = 0.0084$ watt. Thus a reduction in the loss resistance to one-tenth of its original value has resulted in the extraction of approximately 10 times more power from the passing wave and approximately 10 times more power delivered to the useful load. In the case of the tuned loop antenna where the load resistance consists only of the tuned circuit loss resistance, the useful power developing a signal across the tuned circuit impedance will be increased 6 db over the case of the separate load. With this circuit loss resistance decreased to one-tenth of the original value, it will also result in extracting 10 times more power from the wave and delivering this additional power to the load.

When a loop is placed in an electromagnetic field, the voltage induced is given by the line integral $V_{ind} = \oint \bar{E} \cdot \overline{dl}$. According to Maxwell's equations $$V_{ind} = \oint_c^c \bar{E} \cdot \overline{dl} = -\frac{d\vartheta}{dt}$$

where $V_{ind}$ = induced voltage $\oint_c$ = closed line integral $\bar{E}$ = electric field vector
$\overline{dl}$ = differential current
$d\phi$ = differential flux
$dt$ = differential time.

and if the magnetic field is perpendicular to the plane of the coil $$\vartheta = \int_s \bar{B} \cdot dA_c = \mu'_o HA_c$$

where $\bar{B}$ = magnetic flux density vector
$A_c$ = area of the coil
$\mu'_o$ = permeability of free space
$H$ = magnetic field intensity.

Then the voltage induced in a single-turn loop becomes
$V_{ind} = \mu'_o A_c (dH)/(dt)$
and, for sinusoidal variations of the electromagnetic field of angular frequency $\omega$ $$V_{ind} = -j\omega HA_c\mu'_o \quad |V_{ind}| = \omega HA_c\mu'_o$$

and a coil of N turns has an induced voltage $V_{ind} = N\omega HA_c\mu'_o$

Since the E field and the H field are related by the intrinsic impedance of the medium, in free space $$H = \sqrt{\frac{\epsilon'_o}{\mu'_o}}$$

where $\epsilon'_o$ is ther permittivity of free space. Then, since $\mu'_o H = E\sqrt{\mu'_o\epsilon'_o}$ and $c = \frac{1}{\sqrt{\mu'_o\epsilon'_o}}$, the velocity of light, we have $\mu'_o H = E/C$, and the induced voltage can be related to the electric field intensity as follows:

$$V_{ind} = (\omega NA_cE)/C$$

If a ferrite rod is placed in the loop, with the rod and the loop having a common axis, and if the length of the rod is considerably greater than the diameter, there will be a considerable distortion of the magnetic field in the vicinity of the rod causing the induction flux in the coil to increase. This increase in flux will be proportional to the effective relative permeability of the rod. This effective relative permeability of the rod ($\mu_r$) for most practical ferrite antennas is much less than the initial permeability of the ferrite material. Its value is a function of the rod length/diameter ratio as well as the material permeability.

Since the flux is proportional to the effective relative permeability of the rod, the ferrite loaded loop antenna will have an induced voltage $$V_{ind} = (\omega NA_cE)/(C)(\mu_r)$$

if the rod diameter is the same as the loop diameter.

The effective height ($h_{eff}$) of a loop antenna is defined as the ratio of the induced voltage to the electric field intensity in volts/meter $$h_{eff} = V_{ind}/E$$

and the effective height of a ferrite loaded antenna can be expressed $$h_{eff} = \frac{\omega NA_o\mu_r}{c}.$$

The equivalent circuit of this antenna is given in FIG. 4, where $E_{os}$ = signal output voltage
$R_r$ = equivalent parallel loss resistance.

Here the output signal voltage $E_{os}$ is Q times the generator voltage or $$E_{os} = Qh_{eff}E.$$

The thermal noise voltage $E_{on}$ developed at the circuit output terminals will be $$E_{on} = \sqrt{4KT\Delta fR_p}$$

where
$\Delta f$ = 3 db bandwidth
T = temperature in deg K
K = Botzmann's constant
= 1.3890 × 10$^{-23}$ (joules)/(deg K)
$R_p$ = resistance in parallel across antenna output as representing the theoretical loss resistance from all sources.

The equivalent $R_p$ at the output is $R_p = X_LQ$.

Then $E_{on} = \sqrt{4KT\Delta fQX_L}$ and the signal-to-noise ratio can be expressed as $$\frac{S}{N} = \frac{E_{os}}{E_{on}} = \frac{h_{eff}EQ}{\sqrt{4KT\Delta fQX_L}} = \frac{h_{eff}E\sqrt{Q}}{\sqrt{4KT\Delta fX_L}}$$

In view of the foregoing theoretical analysis, the following conclusions can be drawn:

Increased size increases the effective height and performance. If increased performance with a given size is the objective, this approach is trivial and invalid.

Increase of rod permeability provides an increase in effective height. For practical antennas where the $l/d$ ratio is less than 20, the rod permeability is controlled to a greater extent by the $l/d$ ratio than the initial permeability, and analysis of these factors shows that an extensive long-term ferrite development program might possibly improve the initial permeability value without additional loss to twice or even three times the value presently available materials. This would result in an increase of approximately 10 percent in the effective rod permeability.

Increase in the number of turns increases the effective height; however, this increases the loss resistance of the inductance. In practice, there is an optimum number of turns and coil shape to provide the highest signal output. Since this is usually attained with any good antenna design, no improvement can be expected from a simple manipulation of the number of turns on the antenna coil.

Improvement by a substantial reduction in temperature is not possible for a submerged antenna since a large part of the antenna loss is coupled in from the sea. Therefore, even if the antenna could be cryogenically cooled, a major portion of the noise producing resistance would be at approximately 290 deg K.

Changing $\Delta f$ provides improvement in the S/N ratio by providing a reduction in noise. This improvement is presently obtainable with existing equipment simply by reducing the receiving system bandwidth as much as the transmission bit rate will permit.

An increase in Q provides an increase in the S/N ratio. It can be seen from the formula for the S/N ratio that, if the antenna is the bandwidth-limiting element in a system where $\Delta f$ will reduce with an increase in Q, the S/N ratio will increase in direct proportion to the increase in Q.

In a system where the bandwidth is limited in the receiver so that the over-all bandwidth does not change with change in Q, the S/N ratio improvement is proportional to the square root of the increase in Q. Practical antenna designs make full use of this S/N improvement, and it appears as though no additional improvement was available from this quarter, leaving the rather dim conclusion that the room for antenna improvement represented only a few percent.

This picture changes drastically with the use of a tunnel diode and its application to a receiving antenna as a negative resistance device to reduce the antenna loss resistance. Large reductions in antenna core loss, copper loss, and even coupled-in resistive loss from the sea in the case of a submerged antenna is attainable. The use of a tunnel diode results in a step-function improvement in S/N ratio, due to increased Q and considerably increased efficiency. The dual improvement is even more apparent in a low ambient noise antenna system. More negative resistance can be introduced, improving performance to a greater extent, without reaching Q values so high as to limit bandwidth.

For underwater communication, a ferrite antenna has proved particularly useful. A ferrite antenna is a loop type antenna. It is usually composed of a coil consisting of a number of turns around the ferrite that is used to concentrate the magnetic field as shown in FIG. 5. This antenna can be tuned by placing a variable condenser across the winding as shown in FIG. 6. The loss resistance from all sources has the effect of providing an equivalent parallel resistance across the output as shown in FIG. 7 where $R_p$ = parallel resistance impedance at resonance and $R_p = X_LQ$.

If, for any reason, like matching the negative conductance of a tunnel diode, a change in this resistance value is desired, this can be accomplished by a transformer arrangement $R_p$, shown in FIG. 8. Here $R_p$ can be transformed to any desired value $R_p'$ by proper adjustment of turns ratio. The basic principle is simply to place the negative conductance of the diode across the admittance of the antenna that has a slightly higher positive conductance, for example, a tunnel diode with a negative conductance of $6.6 \times 10^{-3}$ mhos connected to a transformed loss conductance of $7.2 \times 10^{-3}$ mhos. The equivalent circuits are shown in FIGS. 9 and 10. This arrangement will provide a terminal admittance of $(7.2 \times 10^{-3}) - (6.6 \times 10^{-3}) = 0.6 \times 10^{-3}$. Conductance is reduced to 1/12 its original value. If this $7.2 \times 10^{-3}$ mhos conductance were the transformed loss conductance of an antenna, this would represent an increase in the antenna Q of 12 times. As discussed, previously, this represents an increase of signal power of 12 times and is manifest as a signal voltage increase at the circuit output terminals of 12 times the original voltage appearing across the circuit resistive impedance that has increased 12 times.

An important consideration is the noise contribution of the tunnel diode. If a noise-free negative conductance was placed in parallel with a positive conductance with thermal noise, the equivalent noise current would be:

$$i_n = \sqrt{4KTG\Delta f}$$

where G is the total parallel conductance and T is the temperature in degrees Kelvin. This then is the same as the noise current that would appear in a single positive conductance of the value provided by the combination of positive and negative conductance.

With regard to the use of tunnel diodes, a tunnel diode is generally believed to make full shot noise in the negative conductance region according to $$\overline{i^2} = 2e\Delta f (1_{c \to v} + 1_{v \to c}),$$

where $e$ is the electronic charge, $\Delta f$ is the width of a rectangular shaped incremental pass band, $l_{c \to v}$ is the long time average current caused by n-region conduction electrons tunneling into p-region valence states, and $l_{v \to c}$ is the long time average current caused by p-region valence electrons tunneling into n-region conduction states. The net direct current is $$I = l_{c \to v} - l_{v \to c}.$$

A. Lesk and J. J. Suran, "Tunnel diode operation and application," Elec. Engrg., vol. 79, pp. 270–277; Apr., 1960.

R. N. Hall, "Tunnel diodes," IRE Trans. on Electron Devices, vol. ED-7, pp. 1–9; Jan., 1960.

D. I. Breitzer, "Noise figure of a tunnel diode mixer," Proc. IRE, vol. 48, pp. 930–936; May, 1960.

The actual amount of noise, however, does not agree with certain experimental observations. Based on observation, it is believed that most of the eligible electrons do not have infinitesimal probability of tunneling and, therefore, the diode need not be as noisy as was first assumed.

The current $l_{v \to c}$ is not smoothed because it comes from a small probability mechanism. Its shot noise should agree with the second component $$\overline{i^2} = 2e\Delta f (1_{c \to v} + 1_{v \to c}).$$

The first component is reduced by smoothing, and the total mean-square noise current should be $$\overline{i^2} = 2e\Delta f (\gamma^2 1_{c \to v} + 1_{v \to c}),$$

where $\gamma^2$ is a smoothing factor roughly equal to that assumed by M. E. Hines, "High frequency negative-resistance circuit principles for Esaki diode application," Bell Sys. Tech. J., vol. 39, pp. 477–513; May, 1960. It is believed that a rough value for $\gamma^2$ can be obtained as follows using Esaki's notation, $$1_{c \to v} = A \int_{E_c}^{E_v} p_c(E) f_c(E) Z_{c \to v} f_v'(E) p_v(E) dE.$$

(L. Esaki, "New phenomenon in narrow germanium junctions," Phys. Rev., vol. 109, pp. 603–604; Jan. 15, 1958.)

$p_c(E)$ = n-conduction band energy level density,
$p_v(E)$ = p-valence band energy level density,
$f_c(E)$ = probability of n-conduction state occupancy,
$f'_v(E) = 1 - f_v(E)$, where
$f_v(E)$ = probability of p-valance state occupancy,
$Z_{c \to v}$ = probability of penetrating the gap,
E = energy level,
$E_c$ = lowest energy level in n-conduction band,
$E_v$ = highest energy level in p-valance band, and
A = a constant multiplier.

In a differential energy range $dE$, the differential contribution to $l_{c \to v}$ is $$dl_{c \to v} = A p_c(E) p_v(E) Z_{c \to v} f_c(E) f'_v(E) dE$$

The last three factors of the foregoing equation, namely, $$Z_{c \to v} f_c(E) f'_v(E)$$

form the joint probability of $c \to v$ tunneling in the energy range $dE$. This probability is important because the differential contribution to mean square noise current is $$2 e \Delta f [1 - Z_{c \to v} f_c(E) f'_v(E)] dl_{c \to v}$$

This formula for shot noise is easily derived, if we assume a binomial distribution for the total number of $c \to v$ electrons during any one sampling interval $\Delta t$, where $$\Delta t = (1)/(2\Delta f)$$

(A. van der Ziel, "Fluctuation Phenomena in Semi-Conductors," Academic Press, Inc., New York, N.Y., pp. 13–14, 1959.)

As forward bias is applied to the diode, the interval between $E_c$ and $E_v$ decreases. FIG. 2d of the aforementioned Lesk and Suran reference shows that $f_c(E)$ and $f'_v(E)$ are almost unity in this energy range; making the joint probability almost equal to $Z_{c \to v}$.

The probability $Z_{c \to v}$ might have a value of about 0.5 from the following hypothesis. Since both sides of the junction must be degenerate, the conduction electrons on the n side are free of the donor atoms, and move about like gas particles, subject only to scattering by impurity centers. (William Shockley, "Electrons and Holes in Semiconductors," D. Van Nostrand Co., Inc. New York, N.Y., p. 283; 1950) The lowest-energy electrons are responsible for the tunneling. Since tunneling requires no change of energy, these electrons are unaware of the potential hill created by the diffusion of the high-energy electrons and holes. This means that the electrons which tunnel are equally likely to move in any direction.

Those electrons on the edge of the junction have a 50 per cent probability of heading across a thin junction, and an equal probability of heading back deeper into the n material. This suggests a value of 0.5 for Esaki's $Z_{c \to v}$. This hypothesis is admittedly crude, and it is unable to take care of refinements such as the contribution from electrons deeper in the n material. It is believed, however, that because of the heavy doping, the electrons adjacent to the junction shield the others so that the value of 0.5 might be fairly universal for any electron which can tunnel.

If all the factors in the aforementioned equations are approximately constant in the range of E from $E_c$ to $E_v$, the integration is simplified because $$1 - Z_{c \to v} f_c f'_v$$

can be taken outside the integral where it simply becomes $\gamma^2$, leading to the first term in the noise equation. Since the first terms account for most of the current and most of the noise, the total shot noise will be reduced by approximately $\gamma^2$, which might be as low as 0.5 from the foregoing discussion.

It should be noted that not all tunnel diodes should show this noise reduction. The experiments of Chang et al. (K. K. N. Chang, G. H. Heilmeier and H. J. Prager, "Low noise tunnel diode down converter having conversion gain," Proc. IRE, vol. 48, pp. 854–858; May, 1960) use diodes having fairly large peak currents, indicating a large ratio of junction area to periphery. This could reduce the surface complications and improve the smoothing.

A receiving antenna system for use in submarines using the foregoing concept is shown in FIG. 11. A ferrite antenna 11 projects from the upper structure 13 of a submarine. A negative resistance element, e.g., tunnel diode 15 is inductively coupled to the antenna, e.g., ferrite antenna 11 via a coupling 17 consisting of one or more turns of wire 19 wound about the ferrite antenna. The tunnel diode 15 is back biased by means of biasing circuit 21 to establish operation in the negative resistance region of its operating characteristic curve. Bias current and coupling are adjusted to provide cancellation of the major portion of the ferrite core losses and the copper losses of the main tuning winding 33.

The biasing circuit 21 includes a battery 25 and potentiometer or variable resistor 27 in parallel with a fixed bias resistor 29 in series with the tunnel diode 15 which, in turn, is in series with the coupling link 17. The main tuning winding 31 includes one or several inductance turns of wire 33 wound around ferrite antenna 11, as well as a tuning capacitor 35 in parallel with the inductance turns. The antenna is connected to the receiver 37 by one or more coupling turns of receiver line 39. Some means of support 43 is to be provided for the ferrite.

Figure 12:
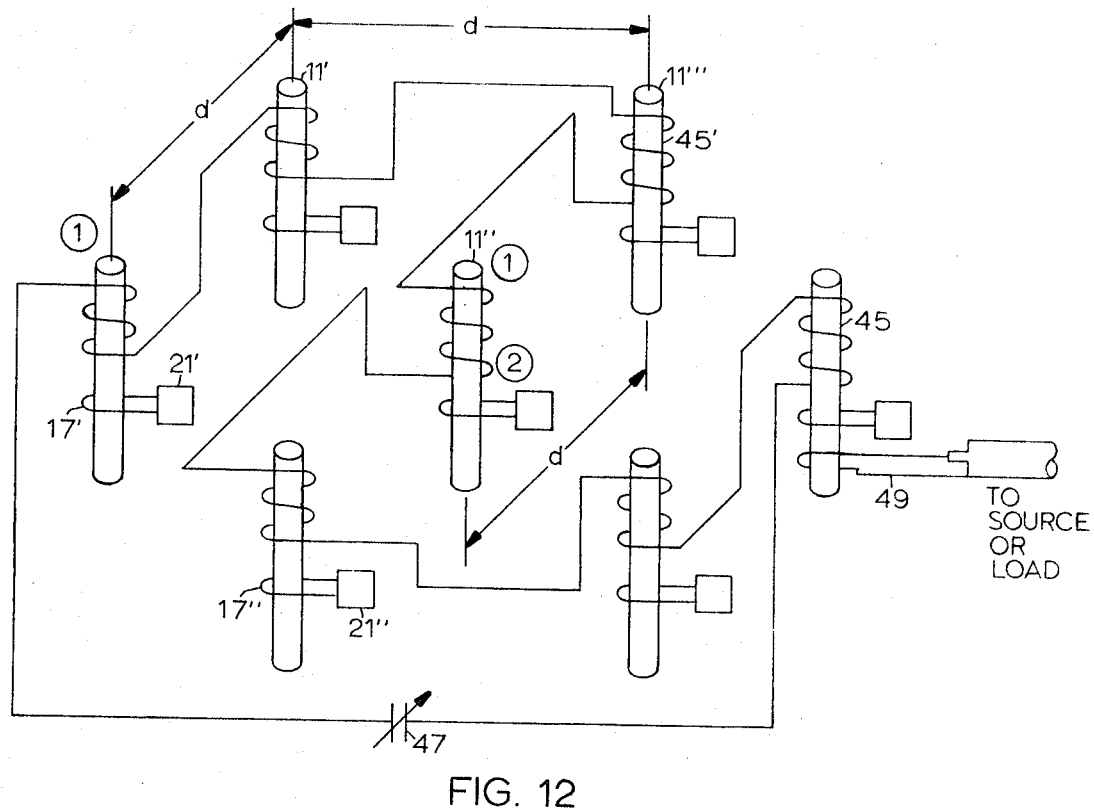
FIG. 12 shows another embodiment of the invention illustrated in FIG. 11.

By using a plurality of ferrite rods in parallel as shown in FIG. 12, it is also possible to provide greater coupling to space than is possible with a single rod of the combined weight and size. In this arrangement, a number of ferrite rods 11', 11'', 11''' are assembled in such a manner as to keep each one separate from the adjoining rod by a finite distance (*d*) which is a function of the rod diameter, length and permeability. The tuning inductance is made up of individual windings 45, 45' connected in series and tuned by a variable capacitor 47. The signal is coupled out of the antenna via coupling link 49. By this arrangement, for a given size and weight of ferrite, a greater efficiency is realized and conversely for a given efficiency, a smaller and lighter antenna is possible. Greater or fewer number of rods may be used and arranged in different geometrical configurations. With this arrangement, one or more tunnel diodes with the biasing circuits 21', 21'' may be coupled to one or more of the individual ferrite rods 11', 11'', 11''' by coupling links 17', 17'', etc. This type of arrangement is exceedingly useful on a small undersea system such as a submarine.

It is to be observed, therefore, that the present invention provides for increasing the working length of a receiving antenna by cancelling the loss resistance of the antenna by means of a negative resistance element biased so that the negative resistance characteristics of the negative resistance element reduces the loss resistance of the antenna.

While the present invention has been described in a preferred embodiment, it will be obvious to those skilled in the art that various modifications can be made therein within the scope of the invention, and it is intended that the appended claims cover all such modifications.

What is claimed is:

1. A receiving antenna for use in submarines comprising in combination:

a plurality of ferrite rods projecting from the structure of a submarine;

a tunnel diode inductively coupled to each rod by at least one turn of wire around the rod;

a back biasing circuit connected to each of said tunnel diodes to establish operation in the negative resistance region of said diodes, said back biasing circuits including power source means, a fixed bias resistor in series with said power source means and said tunnel diode and a variable resistor in parallel with the fixed bias resistor and in series between said power source means and tunnel diode;

a main tuning winding around at least one rod, including a plurality of inductance turns of wire around said rod and a tuning capacitor in parallel with said inductance turns; and, a receiver line coupled to said one rod by at least one coupling turn.

* * * * *